United States Patent [19]

Hugh et al.

[11] 4,188,801
[45] Feb. 19, 1980

[54] UNIVERSAL JOINT

[75] Inventors: Melvin D. Hugh, Wilmington; Chauncey H. Moore, Huntington Park, both of Calif.

[73] Assignee: Ingersoll-Rand Company, Woodcliff Lake, N.J.

[21] Appl. No.: 921,327

[22] Filed: Jul. 3, 1978

[51] Int. Cl.² .................. F16D 3/02; F16D 3/16; F16D 3/50
[52] U.S. Cl. ............................ 64/7; 64/16; 64/9 R
[58] Field of Search ............ 64/7, 16, 9 R; 403/57, 403/359

[56] References Cited

U.S. PATENT DOCUMENTS

| | | | |
|---|---|---|---|
| 2,471,974 | 5/1949 | O'Malley | 64/7 |
| 2,760,358 | 8/1956 | Helm | 64/7 |
| 2,895,314 | 7/1959 | Helm | 64/7 |
| 3,940,946 | 3/1976 | Anderson | 64/7 |
| 3,959,987 | 6/1976 | Garey | 64/9 R |
| 4,080,097 | 3/1978 | Waara | 403/57 |

Primary Examiner—Ira S. Lazarus
Assistant Examiner—R. C. Turner
Attorney, Agent, or Firm—Walter C. Vliet

[57] ABSTRACT

A universal joint for power drive tools and the like. The universal assembly includes a means for connection to a tool and a means for engaging the nut or a head of a fastening member, such as a bolt. Articulation of the universal is accomplished by means of a quadrified ball in a square socket. The head of the ball retains its spherical form, and the base of the socket is spherical in shape to accommodate the ball head. The four sides of the quadrified ball do not intersect thereby retaining the spherical configuration of the ball at the corners. A unique ball spring preloads the socket. The resulting combination is ideally suited for power drive tools wherein the forces generated are high, and the rotation is rapid.

11 Claims, 3 Drawing Figures

UNIVERSAL JOINT

BACKGROUND OF THE INVENTION

There are a number of universal sockets now known in the art which are of the ball and socket type; for example, the patent issued to H. A. Kimball (U.S. Pat. No. 218,278, issued Aug. 5, 1879), the patent issued to A. Koss (U.S. Pat. No. 3,107,505, issued Oct. 22, 1963), and the patent issued to O. G. Phipps (U.S. Pat. No. 3,897,703, issued Aug. 5, 1975). To date, none of these devices have been entirely satisfactory for use in high speed power tools which deliver high rotational torque and/or impact to a fastener.

SUMMARY OF THE INVENTION

The present invention relates to a universal joint device in which the unique ball and socket combination retains the advantages of the ball and socket while improving markedly on the ability of the universal joint to withstand high torque and/or impact at high rotational speeds. The joint further has the capability of withstanding greater axial loading in operation. The ball head of the present invention is a quadrified sphere which has four equal sides, each of which is radiused and sloped in a longitudinal plane and are straight in a transverse plane. The sloped portion of each side is tangent to the radius at a 32° angle from the axis in the embodiment described and can be varied in manufacture as angular articulation requirements are varied. The sides of the quadrified sphere are none-intersecting and are equiangular in respect to each other. The socket is square sided with broadly radiused corners. The bottom of the socket which mates with the head of the ball is spherical to provide a smooth and maximum contact area for absorbing axial loading in the universal.

It is the primary object of the invention to provide a universal joint for power tools and other suitable applications which is a distinct improvement over the prior art, and provides numerous advantages and benefits in high torque and/or impact and highspeed applications.

Another object of the present invention is to provide a ball and socket construction which allows universal pivotal movement of one member with respect to the other while preventing any rotational movement of such member with respect to the other. Particularly, it is an object of the present invention to provide a universal socket which is capable of sustaining high torque and/or impact loadings at high speed without galling or seizing within the socket and without destroying the preload member.

It is a further object of this invention to provide a universal joint which is economical to manufacture and long in life. It is a further object of this invention to provide a universal socket which is preloaded to retain alignment prior to operation and to prevent unnecessary lash in operation.

These and other objects are obtained in a universal joint comprising: an interacting socket and ball member; the socket member having equispaced straight sides and a spherical bottom portion; the ball member having an equal number of radiused and sloped sides which do not intersect; the ball member retaining a spherical head for co-acting with the spherical bottom of the socket member.

The above objects will be further understood in connection with the description of the preferred embodiment.

DESCRIPTION OF THE PREFERRED EMBODIMENT

A preferred embodiment has been selected to illustrate the invention. It should be understood that the illustrated embodiment is susceptible to modification and change without departing from the spirit of the invention.

Figure 1:
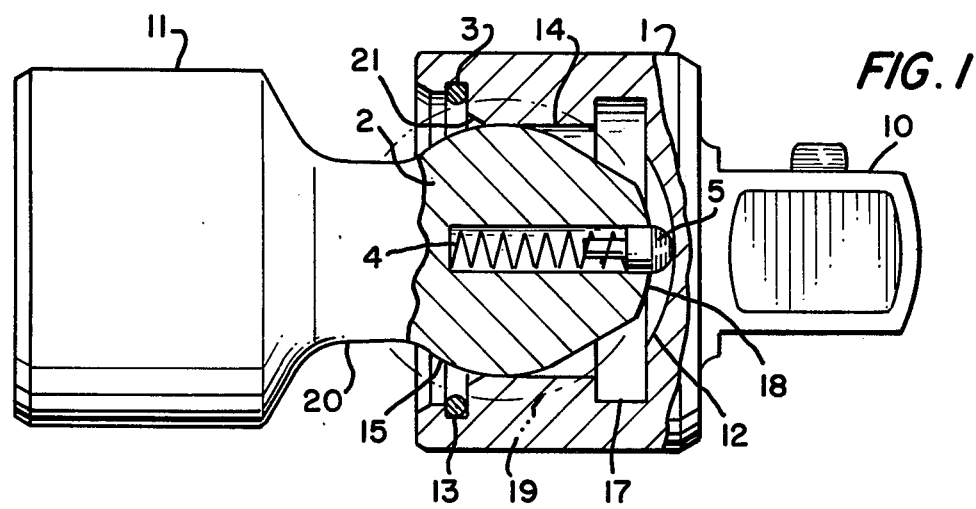
FIG. 1 is a partially sectioned elevation view of the assembly of the universal socket.

Referring to FIG. 1, a socket member 1 of the universal drive is shown. One end of the socket member is provided with a conventional square male drive 10 which is suitable for mating with conventional driving sockets (not shown). A ball member 2 is shown inserted in the socket member. Connected to the ball member 2 is a female square drive member 11 which is suitable for receiving the square male drive member of a typical power tool, such as a nut runner or impact wrench. The female square drive member 11, of course, will also receive a conventional hand drive tool, such as a ratchet wrench. Further, it should be appreciated that the male and female square drive members may be exchanged in location or be of any other suitable drive configuration.

Shown in the section of the socket member is a "C" spring retaining clip which retains the ball member 2 in the socket member. Shown in the section of the ball member is a preload spring 4 which forces or preloads pellet 5 out against the spherical bottom 12 of the socket member. The "C" spring 3 is retained in a spring groove 13, which is circular in section and cut into the body of the socket member.

The socket member contains a square cross section area 14 which co-acts with the quadrified sides of the ball 15 to accomplish rotary drive of the universal. The socket member is provided with a circular undercut 17 as a transition between the square cross section 14 and the spherical bottom of the socket member 12. In severe use, this functions as a lubricating reservoir and loose or foreign particle sump.

Figure 2:
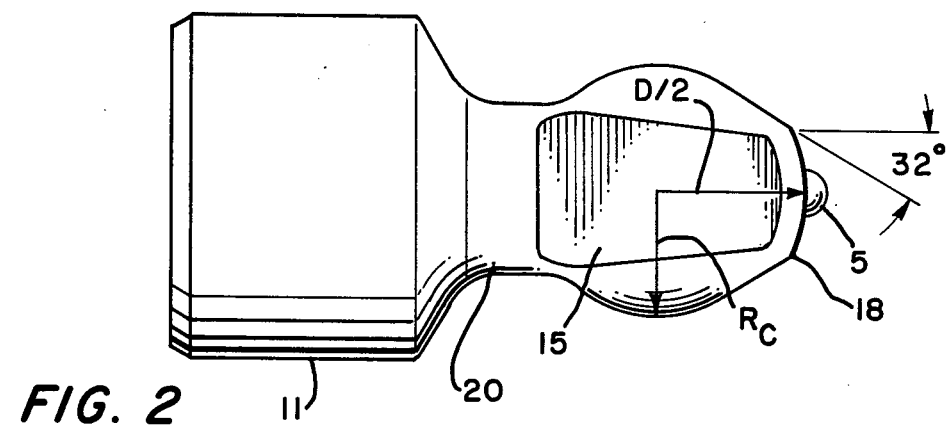
FIG. 2 is a side elevation of the quadrified ball of the universal socket.

A chamfer 21 is provided on the square sides of the socket opening to allow a greater articulation angle. The head of the ball member 18 is spherical as are the corners 19 between the four sides 15. The corners 19 are shown in ghost lines in FIG. 1; in that, they are at 45° from the section shown. FIG. 2 shows an elevation section of the ball member for purposes of defining certain critical dimensions. The dimension "D" is the diameter of the spherical ball represented at the corners and at the head of the ball member. The diameter of the ball "D" is shown. The four sides of the ball 15 are formed by creating a flat, which is curved and sloped in the longitudinal plane and is straight in a transverse plane to the axis of the ball member as shown. Each of the flats on the ball are composed of two parts. A radiused portion and an extended sloped portion which is essentially planer.

The radius "$R_c$" of the flat section is shown on FIG. 2. The sloped portion of the flat is shown as a tangent to the flat at radius "$R_c$" which intersects the axis of the ball member at an angle of 32°. This angle is selected at or near the maximum expected articulation angle of the universal socket. The sloped portion of the flat section helps to reduce stress concentration by giving more linear side contact and longer corner driving lobes. In addition, the tangency results in a spherical head, which is important to the axial load carrying ability of the present invention.

Figure 3:
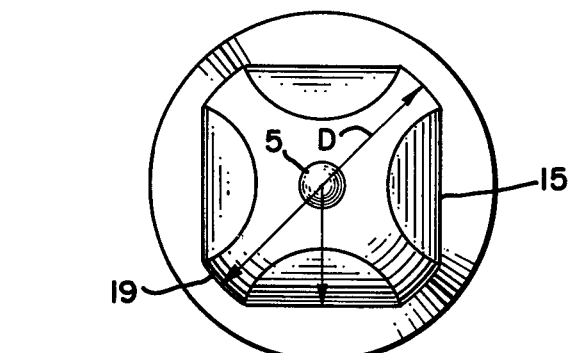
FIG. 3 is an end elevation view of the quadrified ball of the universal socket.

FIG. 3 shows the end elevation of the socket drive showing the quadrified sphere and the spherical corners 19. The corners 19 co-acts with the radiused corners of the square cross section area 14 of the socket member to assist in socket alignment in rotation and provide a bearing surface for the "C" spring retainer 3.

It has been found that a radius to diameter ratio of $Rc/D=0.4$ provides a preferred relationship between the area in the corners 19 and the area of the sides 15 for $\frac{3}{8}$ inch and $\frac{1}{2}$ inch universal drives. In addition, it has been found that a preferred surface and radial gap clearance between the driver and socket portion exists between 0.006 inch to 0.013 inch for universal joints for $\frac{3}{8}$ inch and $\frac{1}{2}$ inch drive sockets.

The above-described universal joint may be used with hand or power tools, but is especially adapted for power tool wherein the service is demanding with regard to high torque, impact, and speed or rotation. The universal joint has been found to be superior in this regard to other known universal joint. The angle of articulation has been chosen as 32° in the embodiment described. This may be more or less with a practical limitation of approximately 45°.

It should be noted that in the present invention there are no exposed springs to be worn, and that all surfaces of contact provide a maximum area of contact to prevent deformation at corners and/or galling or seizing of the universal joint resulting from high point contact. Further, it has been determined that the clearances in such a universal joint are critical for maximum utility and life.

Although we have described the socket as four sided, it should be appreciated by one skilled in the art that the same principles would apply to other number of sides. Although we have described the invention in terms of a universal joint, it should be understood by one skilled in the art that the invention is capable of other uses and applications where pivotal or angle movement of one member with respect with another is required or desired while relative rotational movement is not desired.

I claim:

1. A universal joint which comprises:
an interacting socket and spherical ball member, said socket member having equispaced straight sides and a spherical bottom portion;
said ball member having an equal number of sides each of which are both radiused and sloped and which do not intersect each other and which co-act with said straight sides of said socket member; and
said ball member having a spherical head for coacting with said spherical bottom of said socket member.

2. The universal joint of claim 1 wherein:
the sloped and radiused sides of said ball member are radiused in a longitudinal plane and straight in a transverse plane to the axis of the ball.

3. The universal joint of claim 2 wherein:
the radiused portion of the sides of said ball member terminates in a sloped planer portion towards the spherical head of said ball member.

4. The universal joint of claim 2 wherein:
said ball member is provided with four sloped and radiused sides; and
said socket member is provided with a like number of equispaced straight sides.

5. The universal joint of claim 4 wherein:
the ratio of the radius of the radiused portion of said radiused and sloped sides to the diameter of said ball member is approximately 0.4.

6. The universal joint of claim 2 wherein:
the sloped portion of the radiused and sloped sides of the ball member are sloped at approximately 32° to the longitudinal axis of said ball member.

7. The universal joint of claim 2 wherein:
the surface and radial gap said socket member and said ball member is in the order of 0.006 inch to 0.013 inch for nominal $\frac{3}{8}$ and $\frac{1}{2}$ inch drive universals.

8. The universal joint of claim 2 wherein:
said ball member is provided with a spring force means disposed within said spherical head of said ball means for interacting with said spherical bottom of said socket member for retaining joint alignment and for preloading said joint.

9. The universal joint of claim 8 wherein:
said spring force means is a ball spring embedded in said spherical end of said ball member.

10. The universal joint of claim 1 wherein:
said ball member is retained in said socket member by means of a "C" spring retainer.

11. The universal joint of claim 1 wherein:
a chamfer is provided on the square sides of the socket opening to allow greater articulation angle.

* * * * *